United States Patent [19]
Iida et al.

[11] 3,867,015
[45] Feb. 18, 1975

[54] LIQUID CRYSTAL CELL AND METHOD OF FABRICATION

[75] Inventors: Shuichi Iida; Takao Hayashi; Satoshi Noguchi; Shigemasa Furuuchi, all of Yokohama, Japan

[73] Assignee: Asahi Glass Company Ltd., Tokyo, Japan

[22] Filed: May 23, 1973

[21] Appl. No.: 363,190

[30] Foreign Application Priority Data
May 25, 1972 Japan.............................. 47-51221

[52] U.S. Cl............................ 350/160 LC, 117/218
[51] Int. Cl.................................................. G02f 1/16
[58] Field of Search ....... 350/150, 160 LC; 117/218

[56] References Cited
UNITED STATES PATENTS
3,728,008   4/1973   Allan ......................... 350/160 LC Primary Examiner—Edward S. Bauer
Attorney, Agent, or Firm—Oblon, Fisher, Spivak, McCelland & Maier

[57] ABSTRACT

A fluoroalkyl compound which consists of a functional component having an affinity or reactivity for the inner surfaces of a liquid crystal cell eliminates the turbidity associated with the inner surfaces of the liquid crystal cells. The cell comprises a pair of sealed plates (at least one of which is transparent) which have electro-conductive films coated on the inner surfaces thereof and a liquid crystal material between the pair of plates of the cell.

8 Claims, 1 Drawing Figure

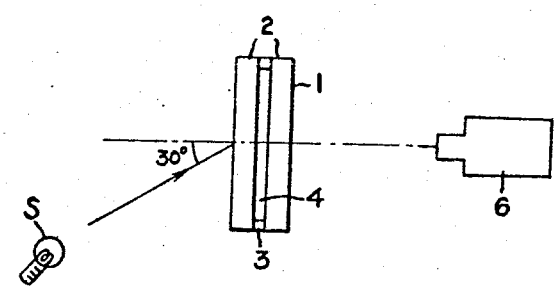

LIQUID CRYSTAL CELL AND METHOD OF FABRICATION

BACKGROUND OF THE INVENTION

1. Field of the Invention

This invention relates to a liquid crystal cell. More particularly, it relates to a liquid crystal cell wherein the orientation of the liquid crystal material within the cell is controlled and contrast is improved.

2. Description of the Prior Art

Liquid crystal cells used for electro-optical display devices, light valves and the like have been formed by the following method. An organic spacer made of a polyester resin for instance, or an inorganic spacer made of a low-melting glass is inserted between a transparent substrate covered with a transparent electro-conductive film and a substrate covered with an electro-conductive film, in order to maintain a predetermined distance between the two substrates. Fabrication of the cells is completed by filling the cells with liquid crystal material and sealing the cells. Among the requirements for liquid crystal materials are that they have a great degree of responsiveness, especially high electro-optical responsiveness to applied voltages as well as have a broad working temperature range. It has been observed that when a mixture of liquid crystals is sealed in cells to form liquid crystal cells, turbidity occurs within the liquid crystal which is caused by an irregular alignment of the liquid crystal molecules in the liquid crystal medium or on the inner surfaces of the cell because of nonuniform orientation of the liquid crystal or because nonuniform operations are not obtained when voltages are applied.

A need, therefore, exists for a liquid crystal which does not suffer from turbidity problems when voltages are applied.

SUMMARY OF THE INVENTION

Accordingly, one object of this invention is to provide a liquid crystal cell which controls the orientation of the liquid crystal material.

Another object of this invention is to provide a liquid crystal display device which has excellent contrast.

Yet another object of this invention is to provide a method of fabricating a liquid crystal cell which controls the orientation of the liquid crystal material.

Briefly, these objects and other objects of this invention as hereinafter will become readily apparent can be attained by applying a fluoroalkyl compound having a functional portion to the cell wherein the functional portion of the compound has an affinity or reactivity for the inner surface of the cells.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

FIG. 1 is a schematic view of a cell filled with a liquid crystal material and an apparatus consisting of a photometer and a light source for the measurement of the intensity of scattered light through the cell.

DESCRIPTION OF THE PREFERRED EMBODIMENTS

The fluoroalkyl compound which has a functional portion having an affinity or reactivity to the inner surfaces of the cell is composed of a fluoroalkyl component (A) and a functional component (B) which is absorbed on or reacts with the inner surface of the cell. The fluoroalkyl component (A) is usually a $C_{4-20}$ straight chain or branched chain fluoroalkyl component, which can contain multiple bonds. The component preferably contains a terminal $C_{1-4}$ fluoroalkyl group which is saturated with fluorine atoms. The functional component (B) which is absorbed on or reacts with the inner surface of the cell has a functional group which has an affinity or reactivity for an inner surface of the cell and which can be derived from such materials as alcohols, polyols, amines, polyamines, esters, amides, alkoxysilanes, halogenosilanes, polyoxyethylene, polyesters, and the like. The fluoroalkyl compound containing said components (A) and (B) is hereinafter referred to as a functional fluoroalkyl compound. Suitable functional fluoroalkyl compounds include

$C_nF_{2n+1}(CH_2)_mOH$,

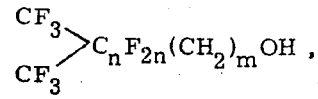

$C_nF_{2n+1}SO_2N(C_2H_5)(C_2H_4O)_m H$,

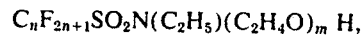

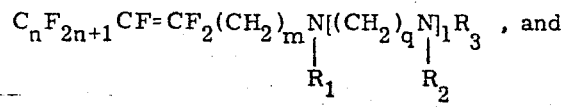

$C_nF_{2n+1}(CH_2)_mSi(OC_2H_5)_3$ wherein $n$ preferably ranges from 4 – 20, $m$ preferably ranges from 2 – 10 and $q$ ranges from 2 – 5;

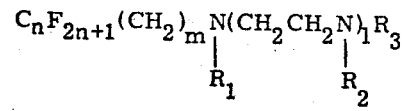

wherein $n$ is 4 – 20, $m$ is 2 – 10, $l$ is 1 – 5 and $R_1$, $R_2$ and $R_3$ represent H or $C_{1-4}$ alkyl groups;

$[C_nF_{2n+1}(CH_2)_m]_iSi(OR)_{4-i}$ wherein $i$ is 1 – 2 and R represents $C_{1-4}$ alkyl groups;

$[C_nF_{2n+1}(CH_2)_m]_iSiX_{4-i}$ wherein $i$ is 1 – 2 and X represents a halogen atom;

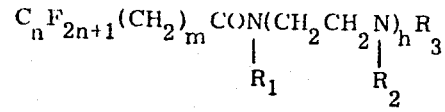

wherein $R_1$, $R_2$ and $R_3$ represent H or $C_{1-4}$ alkyl groups and $h$ is 1 – 5;

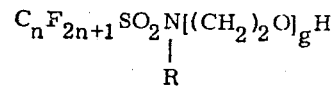

wherein $g$ is 1 – 30 and R represents alkyl groups;

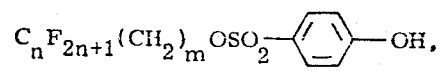

$C_nF_{2n+1}(CH_2)_mOCOR$, wherein R represents a $C_{1-18}$ alkyl group;

$$[C_nF_{2n+1}(CH_2)_mO]_fP(OR)_{3-f}$$
$$\parallel$$
$$O$$

wherein $f$ is a number from 1 – 3 and R represents an alkyl group;

$C_nF_{2n+1}(CH_2)_mO(CH_2CH_2O)_eH$ wherein $e$ is a number from 1 – 30;

$$C_nF_{2n+1}(CH_2)_mN\begin{matrix}R_1\\R_2\end{matrix}$$

wherein $R_1$ and $R_2$ represent hydrogen or $C_{1-40}$ alkyl groups and $R_1$ and $R_2$ represent a benzene ring.

The turbidity which exists in conventional cells can be eliminated by using any of the functional fluoroalkyl compounds. However, it is preferable to use a functional fluoroalkyl compound which has good miscibility with the liquid crystal material and includes $C_nF_{2n+1}(CH_2)_mOH$, $$\begin{matrix}CF_3\\CF_3\end{matrix}\!\!>\!C_nF_{2n}(CH_2)_mOH,$$

$C_nF_{2n+1}SO_2N(C_2H_5)(C_2H_4O)_mH$,
$C_nF_{2n+1}CF=CF_2(CH_2)_2NH(CH_2)_3N(CH_3)_2$, and
$C_nF_{2n+1}(CH_2)_2Si(OC_2H_5)_3$, wherein $n$ is preferably 4 – 20 and $m$ is preferably 2 – 10. It is especially preferable to use functional fluoroalkyl compounds containing the fluoroalkyl component (A) at one end and the functional component (B) at the other end which are oriented in a direction vertical to the inner surface of the cell, such as $C_nF_{2n+1}(CH_2)_mOH$,
$C_nF_{2n+1}CF=CF_2(CH_2)_2NH(CH_2)_3N(CH_3)_2$,
$C_nF_{2n+1}(CH_2)_mSi(OC_2H_5)_3$, and $$[C_nF_{2n+1}(CH_2)_mO]_fP(OR)_{3-f}$$
$$\parallel$$
$$O$$

wherein $n$ is 4 – 20, $m$ is 2 – 10, $f$ is 1 – 3 and R represents an alkyl group.

Suitable liquid crystal material used in the liquid crystal cells include nematic liquid crystal materials such as 4-methoxybenzylidene-4'-butylaniline (MBBA), 4-ethoxybenzylidene-4'-butylaniline (EBBA), anisylidene-p-aminophenyl acetate (APAPA or mixtures thereof.

In the process of the invention, the functional fluoroalkyl compound is applied on the inner surface of the cell by adding a small amount of the functional fluoroalkyl compound to the liquid crystal material or by treating the inner surface of the cell with the functional fluoroalkyl compound before filling the cell with the liquid crystal material. The reason for the turbidity which occurs in conventional cells is not clear. However, it is considered that certain partially active areas form on the surface of the electroconductive film which covers the surface of the substrate. Consequently, when the liquid crystal material is sealed in the cell, the orientation of the liquid crystal material is non-uniform in the active portions of the cell which causes the turbidity.

The cells of this invention contain substrates which include the known inorganic materials such as glass, ceramics or metals or organic materials such as plastics. Usually, a transparent material such as glass is used as the front substrate and a transparent or opaque material is used as the rear substrate. The electro-conductive film which is applied over the substrate is a transparent electro-conductive film which is coated on the substrate by a vacuum deposition procedure or the like. Suitable materials for the transparent electro-conductive film include $SnO_2$ and/or $In_2O_3$, and the like. It is also possible to use a reflective electro-conductive film such as aluminum on the rear sustrate.

In the method of fabricating the liquid crystal cells of this invention, a pair of substrates covered with electro-conductive film are maintained in position at a predetermined distance from each other by a spacer consisting of an inorganic cement comprising a low-melting glass or organic cement such as an epoxy resin to which the substrates adhere. The functional fluoroalkyl compound is added to the cell through a hole suitably disposed for filling the cell with liquid crystal material or the liquid crystal material is added as a solution in a solvent such as an alcohol to treat the inner surface of the cell for 2 – 30 minutes. After the treatment, the cell is washed with an inert liquid such as water, ethyl alcohol, acetone, and the like to remove any remaining functional fluoroalkyl compound and the cell is dried. The cell is then filled with the liquid crystal material and the hole is sealed to complete the fabrication of the liquid crystal cell. When the cell is dried at 50°– 200°C for 20 – 60 minutes, bonding of the functional fluoroalkyl compound to the inner surface of the cell is completed to yield the preferable liquid crystal cell of this invention. Preferably, bonding of the functional fluoroalkyl compound to the inner surface of the cell is enhanced by treating the compound with, for example, alkali or moisture.

In one embodiment of the invention the electro-conductive film on the inner surface of the substrate is treated with the functional fluoroalkyl compound, and two sheets of the substrate covered with said treated electro-conductive film are maintained at a predetermined distance from one another. The substrates are sealed with an organic cement such as epoxy, urethane, silane, polyamide cements and the like and the cell is filled with the liquid crystal material to form the liquid crystal cell of this invention.

In another embodiment of this invention a pair of stubstrates covered with electro-conductive films are separated at a predetermined distance and the peripheral areas of the substrates are sealed together with an organic cement such as a polyester resin or an inorganic cement such as a low melting glass to form a cell. A small amount (about 1 – 5%) by weight of the functional fluoroalkyl compound is added to the liquid crystal material and the liquid crystal cell is filled with the mixture.

Briefly, the technique of the first method involves treating the inner surfaces of the cells with the functional fluoroalkyl compound before filling the liquid crystal cell with material while in the second method a combined solution of liquid crystal material and functional fluoroalkyl compound are added to the cell to treat the inner surfaces of the cell.

From the standpoint of operability and industrial utility, the method in which the functional fluoroalkyl compound in the liquid crystal material is added to the cell is employed. When a compound having a reactive group such as an alkoxy silane group is used, it effectively treats the inner surface of the cell.

Having generally described this invention, a further understanding can be obtained by reference to certain specific examples which are provided herein for purpose of illustration only and are not intended to be limiting unless otherwise specified.

EXAMPLE

In an alumina pot, a $PbO-B_2O_3$ low-melting glass was crushed to a powder having an average diameter of $2.4\mu$ and the powder was admixed with a vehicle to prepare a paste. The paste 3 (FIG. 7) was screen-printed on an electro-conductive film coated glass plate 2 through a stainless-steel screen (200 mesh). A cell 1 was formed by joining the printed glass plate with another glass plate 2 coated with an electroconductive film by heating the joined plates at 430°C in air leaving a space 4 between the opposite surfaces of the cell.

A. The inner surface of the cell 1 was washed with acetone and was dried. A cell was filled with a liquid crystal material of a 1 : 1 mixture of p-methoxy benzylidene p-n-butyl aniline (MBBA) and p-ethoxy benzylidene p-n-butyl aniline (EBBA). The cell filled with this liquid crystal material developed a degree of turbidity which was caused by the nonuniformity in the orientation of the liquid crystal molecules.

B. The inner surface of the cell was washed with acetone and dried. A liquid crystal material consisting of a 1 : 1 mixture of MBBA and EBBA and 2% by weight $C_7F_{15}(CH_2)_3OH$ was added to the cell. The cell filled with this liquid crystal material did not develop turbidity and was operated in a normal fashion by a voltage impressed across the cell.

C. The inner surface of the cell was washed with acetone and dried. A liquid crystal material consisting of a 1 : 1 mixture of MBBA and EBBA and 2% by weight $C_6F_{13}CF=CF_2CH_2CH_2NH(CH_2)_3N(CH_3)_2$ was added to the cell. The cell filled with this liquid crystal material did not develop turbidity and was operated in a normal fashion by a voltage impressed across the cell.

D. The inner surface of the cell was exposed to a humid atmosphere and was dipped in $C_6F_{13}(CH_2)_2Si(OC_2H_5)_3$ at room temperature for 5 minutes. The cell was then washed with alcohol and dried at 150°C for 30 minutes. A liquid crystal material of a 1 : 1 mixture of MBBA and EBBA was added to the cell. The cell filled with this liquid crystal material did not develope turbidity and was operated in a normal fashion by a voltage impressed across the cell.

The cells of Examples (B), (C), and (D) were observed with a polarizing microscope, whereby it was confirmed that the long axis of the liquid crystal molecules were vertically oriented to the inner surfaces of the cell. The intensity of the scattered light of the cells of Examples (A), (B), (C), and (D) was also measured when no voltage was impressed across the cell.

In the measurement of the scattered light, (FIG. 1) light reflected vertically through the cell from a source of light 5 positioned at a 30° angle off the vertical direction in the back of the cell was measured along the vertical direction by a scattering photometer 6. The results obtained showed that the ratio of the intensity of the scattered light of the cell of Example A to that of each cell of Examples (B), (C), and (D) was 4 : 1. In other words, the intensity of the scattered light of the cell of Examples (B), (C), and (D) was less than that of Example (A) when no voltage was impressed across the cells. This confirmed that the contrast of the cells of Examples (B), (C), and (D) had improved over that of Example (A) when a voltage was impressed across the cells.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. In a liquid crystal cell comprising a pair of substrates each covered with an electro-conductive film wherein at least one of the substrates is transparent and wherein a liquid crystal material fills the space between the substrates, the periphery of the substrates being sealed, the improvement which comprises applying to the inner surface of the cell a functional fluoroalkyl compound containing a fluoroalkyl component and a functional component which has an affinity and reactivity to the inner surface of the cell.

2. The liquid crystal cell according to claim 1, wherein the functional component of said functional fluoroalkyl compound contains a functional group which has an affinity or reactivity for the inner surface of the cell.

3. The liquid crystal cell according to claim 1, wherein said functional component is an alcohol, polyol, amine, polyamine, ester, amide, alkoxysilane, halogenosilane, polyoxyethylene, or polyether.

4. The liquid crystal cell according to claim 1, wherein said functional fluoroalkyl compound is selected from the group consisting of $C_nF_{2n+1}(CH_2)_mOH$, $(CF_3)_2 - C_nF_{2n+1}(CH_2)_mOH$,

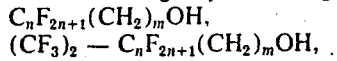

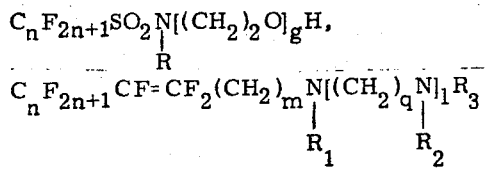

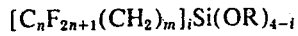

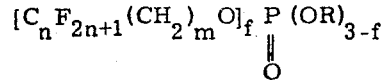

wherein $f$ is 1 – 3, $g$ is 1 – 30, $q$ is 2 – 5, $i$ is 1 – 2 and $l$ is 1 – 5, $m$ is 2 – 10, $n$ is 4 – 20, R represents a $C_{1-4}$ alkyl group and $R_1$, $R_2$ and $R_3$ represent a H or $C_{1-4}$ alkyl group.

5. In a method of fabricating a liquid crystal cell by forming a cell from a pair of substrates coated with electroconductive films, one of which is transparent, and disposed at a predetermined distance from each other, filling said cell with a liquid crystal material and sealing said cell, the improvement which comprises: coating the inner surfaces of said cell with a functional fluoroalkyl compound containing a fluoroalkyl component and a functional component, wherein said functional component has an affinity or reactivity to the inner surface of said cell.

6. The method according to claim 5, wherein the inner surfaces of said substrate which form said cell are treated with the functional fluoroalkyl compound, and wherein the inner surfaces of said cell are washed and dried before filling said cell with the liquid crystal material.

7. The method according to claim 5, wherein 1 – 5% by weight of said functional fluoroalkyl compound is added to said liquid crystal material in order to treat the inner surfaces of said cell.

8. The method according to claim 5, wherein said functional fluoroalkyl compound is selected from the group consisting of $C_nF_{2n+1}(CH_2)_mOH$, $(CF_3)_2C_nF_{2n+1}(CH_2)_mOH$,

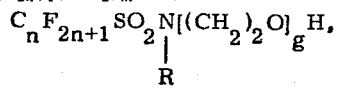

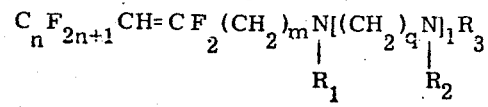

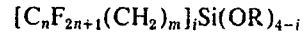

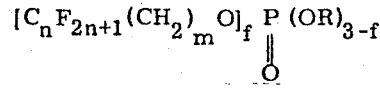

wherein $f$ is 1 – 3, $g$ is 1 – 30, $q$ is 2 – 5, $i$ is 1 – 2 and $l$ is 1 – 5, $m$ is 2 – 10, $n$ is 4 – 20, R represents a $C_{1-4}$ alkyl group, and $R_1$, $R_2$ and $R_3$ represent a H or $C_{1-4}$ alkyl group.

* * * * *